United States Patent [19]
Kim et al.

[11] Patent Number: 5,090,099
[45] Date of Patent: Feb. 25, 1992

[54] METHOD FOR MANUFACTURING MULTILAYER CERAMIC CAPACITOR

[75] Inventors: Yoon Ho Kim, Seoul; Jae Ung Ko, Changwon; Hae Keun Shin, Seoul, all of Rep. of Korea

[73] Assignee: Korea Institute of Science & Technology, Seoul, Rep. of Korea

[21] Appl. No.: 639,509

[22] Filed: Jan. 8, 1991

[30] Foreign Application Priority Data

Apr. 7, 1990 [KR] Rep. of Korea .................. 4784/1990

[51] Int. Cl.$^5$ .................. H01G 4/12; H01G 4/30
[52] U.S. Cl. .................. 29/25.42; 264/61; 427/81
[58] Field of Search .................. 29/25.42; 427/79, 81, 427/124; 264/61, 64

[56] References Cited

U.S. PATENT DOCUMENTS

| | | | |
|---|---|---|---|
| 3,965,552 | 6/1976 | Rutt | 29/25.42 |
| 4,652,967 | 3/1987 | Sakabe et al. | 29/25.42 X |
| 4,935,843 | 6/1990 | McLaughlin et al. | 29/25.42 X |

*Primary Examiner*—Carl E. Hall
*Attorney, Agent, or Firm*—Townsend and Townsend

[57] ABSTRACT

A manufacturing method for multilayer ceramic capacitors in which the surface energy of the pore layers for forming the internal electrodes produced after sintering is raised by chemical reduction so that the subsequent molten metal injection process does not require high pressure. Also a novel quasi-electrode material which enables spontaneous permeation of the molten electrode material into the pore layers.

9 Claims, 3 Drawing Sheets

METHOD FOR MANUFACTURING MULTILAYER CERAMIC CAPACITOR

BACKGROUND OF THE INVENTION

The present invention relates to a method for manufacturing a multilayer ceramic capacitor, and more particularly, to a method for manufacturing a multilayer ceramic capacitor by injecting electrodes into pore layers formed among the dielectric layers through sintering process. The pore layers are reduced and the surface energy of the pore layers is raised so that spontaneous injection or implantation of molten metal for forming the internal electrodes is possible without applying high pressure.

In general, multilayer ceramic capacitors are not only widely used compared to other types of capacitors due to the relatively high dielectric constant of titanic acid barium which forms the dielectric, but also due to the high static electrical capacity per unit volume.

Multilayer ceramic capacitors are made by alternately stacking a number of thin dielectric layers and internal electrodes. There are two general methods for manufacturing multilayer ceramic capacitors. In one method, the materials for the internal electrodes and ceramic dielectric are sintered simultaneously. In the second method, an electrode material is injected or implanted after sintering the dielectric material.

In the first method of simultaneously sintering the electrode and dielectric materials, an electrode-forming paste of precious metals, such as platinum or gold, is applied on one surface of the thin ceramic dielectric layers or sheets. A number of these sheets, rectangularly shaped, are stacked and subjected to sintering at a high temperature to manufacture the ceramic capacitor. This method uses expensive precious metals, such as Au, Pd, and Ag/Pd, which are stable in a high temperature oxidization atmospheric environment, as internal electrode materials. Not only is manufacturing cost high there are problems in low manufacturing yields since these electrode materials have different thermal expansion coefficients than the dielectric material, which cause contact problems between the internal electrodes and dielectric upon sintering.

In order to avoid the problems encountered in this simultaneous sintering method of electrode and dielectric, alternative methods for manufacturing a ceramic capacitor in which expensive precious metal electrode material is not used must be found. In place of the electrode material layers, open-structured or pore layers are formed among dielectric layers so that molten metal may be injected into the pore layers to form the internal electrodes. This method is described in U.S. Pat. Nos. 3,679,950; 3,965,552; 4,030,004; and 4,353,957.

According to this method of injecting molten metal into the pore layers, a quasi-electrode material, which includes organic substances, is applied by painting or screen printing on a large number of ceramic dielectric rectangular sheets. The sheets are stacked and a sintering process is performed to obtain the pore layers by the combustion of organic substance. Then molten metal, such as tin, copper, aluminum, lead, arsenic and indium, is injected into the pore layers to form the internal electrodes of the capacitor. The manufacturing cost of this method is less than the simultaneous sintering method with precious metal internal electrodes. In the pore layer process, relatively low-priced metals, such as tin and the like, are used for electrode material. There is a further advantage in that a dielectric which is fine in structure and high in dielectric index can be obtained by performing the sintering process at high temperatures.

However, according to this method, high pressures over 10 atmospheres must be applied for injecting the molten metal into the interior of the pore layers formed through sintering. Complex equipment must be installed and the manufacturing process is complicated by such high pressure requirements. Consequently, mass production of capacitors with this method is difficult.

SUMMARY OF THE INVENTION

Therefore, an object of the present invention is to provide a manufacturing method of multilayer ceramic capacitors in which the surface energy of the pore layers for forming the internal electrodes produced through sintering is raised so that the subsequent molten metal injection process does not require high pressure.

Another object of the present invention is to provide a novel quasi-electrode material which enables spontaneous permeation of molten electrode material.

Particularly, the present invention uses lead, tin, or an alloy of lead and tin, which have low temperature melting points, for injecting into the pore layers. In order to fill the voids of the pore layers, wetting is required. Wetting characteristics are determined by the surface energy between the material forming the pore layer and the injected metal.

In thermodynamic terms, the spontaneous permeation of molten metal becomes possible in cases where the surface energy of the material which forms the pore layers is high relative to the surface energy of molten metal. Thus the surface energy of pore layer should be higher than the surface energy of molten metal in order to inject the molten metal to form the internal electrodes in the pore layers without applying high pressure.

Accordingly, the present invention increases the surface energy of the pore layers material by including a metal on the surface of pore layer which maintains the surface of pore layer material at a high energy.

On the other hand, although the surface energy can be increased by including a metal on the pore layer, the metal is oxidized during the sintering of ceramic material to lower the surface energy. According to the present invention, the metal oxidized during sintering is reduced again by heat treatment in a reducing environment to keep the surface energy high.

That is, the present invention uses a metal as a pore layer material in which an oxide is formed upon sintering but which is easily reduced at such a temperature that the dielectric material is not reduced. In the present invention, NiO is used as the material.

Particularly, since NiO does not melt during the sintering of the dielectric, NiO serves a supporting function within the interior of pore layer. The material is easily reduced at a relatively low temperature to keep the titanic acid barium from becoming a semiconductor. Simultaneously, the surface energy of the pore layer is raised to the surface energy of nickel.

BRIEF DESCRIPTION OF THE DRAWINGS

FIGS. 1A to 1E are explanatory views illustrating the manufacturing process of the present invention, in which FIG. 1A shows that a quasi-electrode material is coated on a dielectric layer, FIG. 1B shows the stacking method of the dielectric layers, FIG. 1C shows a state in which stacking is completed, FIG. 1D is a longitudinal sectional view of FIG. 1C, FIG. 1E shows a capacitor coupled with external electrodes.

DETAILED DESCRIPTION OF THE INVENTION

Figure 1A:
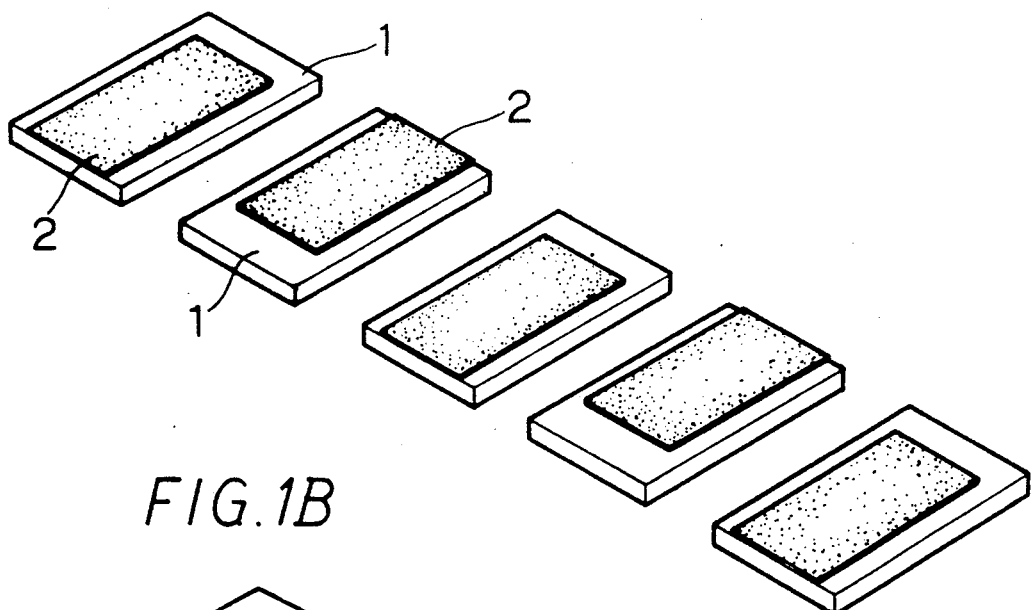
Figure 1B:
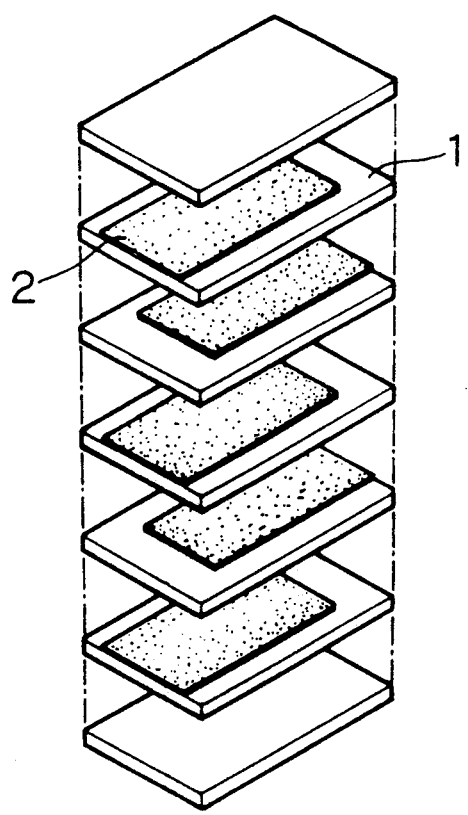
Figure 1C:
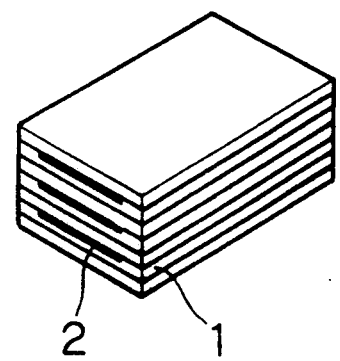
Figure 1D:
Figure 1E:
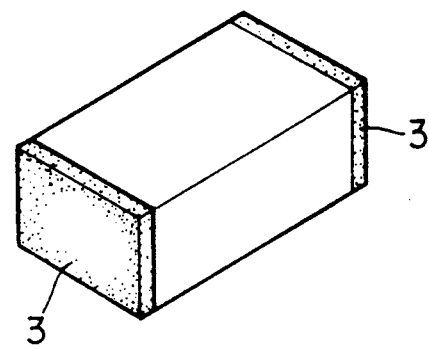

The manufacturing method of a multilayer ceramic capacitor according to the present invention will be described in detail with reference to the accompanying drawings hereinafter.

FIG. 1A to FIG. 1E are diagrams illustrating the manufacturing process of a multilayer ceramic capacitor according to the present invention. As shown in the drawings, after a large number of rectangular thin dielectric layers 1 are formed by a taping method, a quasi-electrode material 2 is applied on one surface of the dielectric layers 1 by a screen printing method. Only one end edge portion of the quasi-electrode material 2 is applied up to the end portion of dielectric layer 1. Furthermore, the other three end edge portions are positioned within the interior of the dielectric layer 1. Then the dielectric layers 1 with the quasi-electrode materials 2 are stacked one-by-one so that the exposed edge portion of the quasi-electrode materials 2 are positioned alternately in the dielectric layers 1. The stacked layers are sintered. Then metal electrode material is injected into the pore layers which are formed from the quasi-electrode material during sintering. Thereafter, external electrodes 3 are coupled to both side surfaces, and a ceramic capacitor is obtained.

Figure 2:
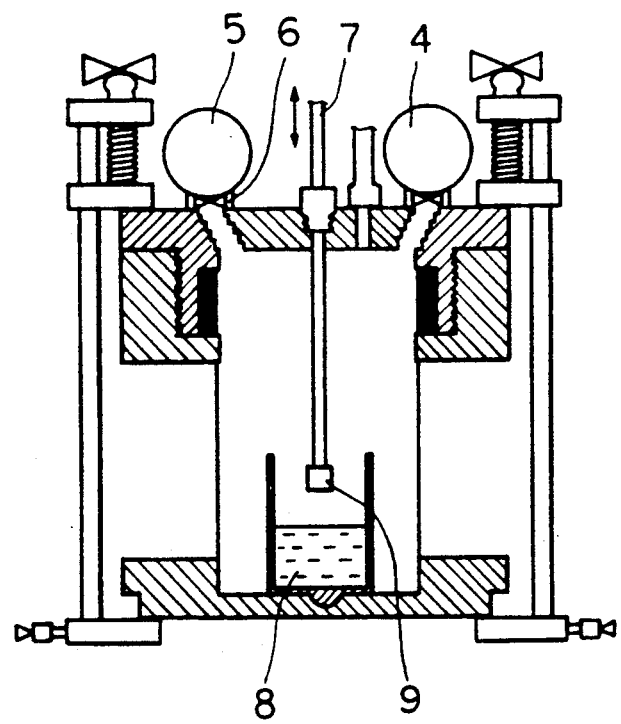
FIG. 2 is a schematic cross-sectional view of an apparatus for injecting molten metal into the interior of the pore layers.

FIG. 2 is a cross-sectional view showing schematically an equipment for injecting the molten metal into the interior of pore layers to form the internal electrodes after sintering. As shown in the drawing, the interior of electrode injecting equipment includes a pressure gauge 4, a vacuum gauge 5, cocks 6 and a supporting rod 7 capable of ascending and descending upward and downward. In the injection process, the metal 8 is heated to a molten state. The pressure within the interior of the equipment is appropriately controlled and then a sample piece 9 which has completed the sintering process, is fixed to the bottom end of the supporting rod 7. Air within the sample piece 9 is removed and thereafter, the supporting rod 7 is lowered toward the molten metal 8. The molten metal 8 fills the interior of pore layers of the sample piece 9 by capillary action.

The present invention uses as the quasi-electrode material for the formation of the pore layer, $2NiCO_3-3Ni(OH)_2-4H_2O$ and carbon black mixed to a 4:1 ration (by weight). Organic material of equal quantity with this mixture is mixed to obtain the quasi-electrode material.

The NiO in the resulting pore layer after sintering is then reduced at 700° C. and heat-treated. The surface energy requirement which enables spontaneous permeation of the molten metal into the pore layer according to the present invention has been confirmed by measurements of the contacting angles between Ni and tin, and Ni and lead-tin alloy. Contacting angles of 20°–50° have been observed.

Figure 3:
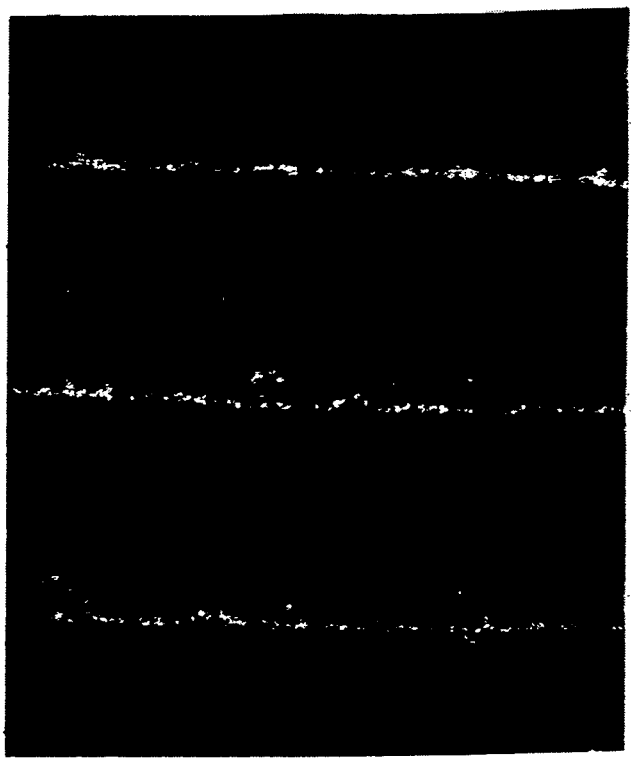
FIG. 3 is an electron-scanning microscope photograph showing the minute structure of ceramic capacitor manufactured by the present invention.

FIG. 3 is an enlarged photograph of the minute structure of multilayer ceramic capacitor manufactured according to the present invention. The portion indicated by a white line in the photograph is the internal electrode which has permeated into the pore layer. It can be seen that the tin has permeated successfully through the pore layer for the desired internal electrode.

The static electric capacity of the capacitor manufacture according to the present invention represents a value of approximately 70% in comparison with the theoretical static electric capacity calculated from dielectric index of ceramic dielectric and the shape of capacitor. This shows that the injected tin can serve very well the function of internal electrodes.

Stated differently, there is a relatively small decrease of about 30% of the total static electric capacity caused by the decrease of the effective electrode area with respect to the total contact area between the pore layer material and dielectric layer.

As described above, the present invention, in the manufacture of a multilayer ceramic capacitor through the injected electrode method, has the advantage that spontaneous permeation of the molten metal into the pore layer is achievable without applying high pressure. This reduces the manufacturing costs of ceramic capacitors.

What is claimed is:

1. In a method for manufacturing a multilayer ceramic capacitor by injecting molten metal into pore layers produced by stacking and sintering dielectric layers applied with a quasi-electrode material, the step of subjecting said pore layers to a reducing to remove oxidation caused by said sintering whereby said molten metal permeates into said pore layers, without applying high pressure, to form interior electrodes of said multilayer ceramic capacitor.

2. The method of claim 1 further comprising the step of using a mixture of $2NiCo_3-3Ni(OH)_2-4H_2O$ and carbon black as said quasi-electrode material.

3. The method of claim 1 wherein said molten metal injecting step comprises using a metal selected from lead, tin or lead-tin alloy as said molten metal for forming said internal electrodes.

4. The method of claim 1 wherein said pore layers are reduced to nickel metal by said reducing step whereby surface energy of said pore layers is increased to correspond to surface energy of said molten metal so that contact between said pore layer and said molten metal is increased.

5. A method of manufacturing a multilayer ceramic capacitor comprising
applying a quasi-electrode material on a plurality of dielectric layers;
stacking said dielectric layers;
sintering said dielectric layers wherein said quasi-electrode material turns into pore layers between said stacked dielectric layers;
subjecting said pore layers to a reducing environment; and
injecting molten metal into said pore layers to create internal electrodes for said capacitor;
whereby said subjecting step improves permeation of said molten metal into said pore layers.

6. The method of claim 5 wherein said applying step includes applying a mixture of $2NiCo_3-3Ni(OH)_2-4H_2O$ and carbon black as said quasi-electrode material.

7. The method of claim 5 wherein said injecting step includes injecting a metal selected from lead, tin or lead-tin alloy.

8. The method of claim 5 wherein said quasi-electrode material after sintering has a surface energy greater than the surface energy of said molten metal.

9. The method of claim 5 wherein said subjecting step comprises reducing NiO in said pore layers.

* * * * *